No. 634,520. Patented Oct. 10, 1899.
W. J. CHAPMAN.
BICYCLE GUARD.
(Application filed Dec. 19, 1898.)
(No Model.) 2 Sheets—Sheet 2.
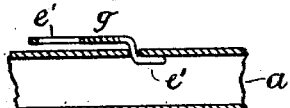
Fig. 9
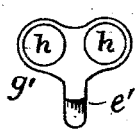
Fig. 8
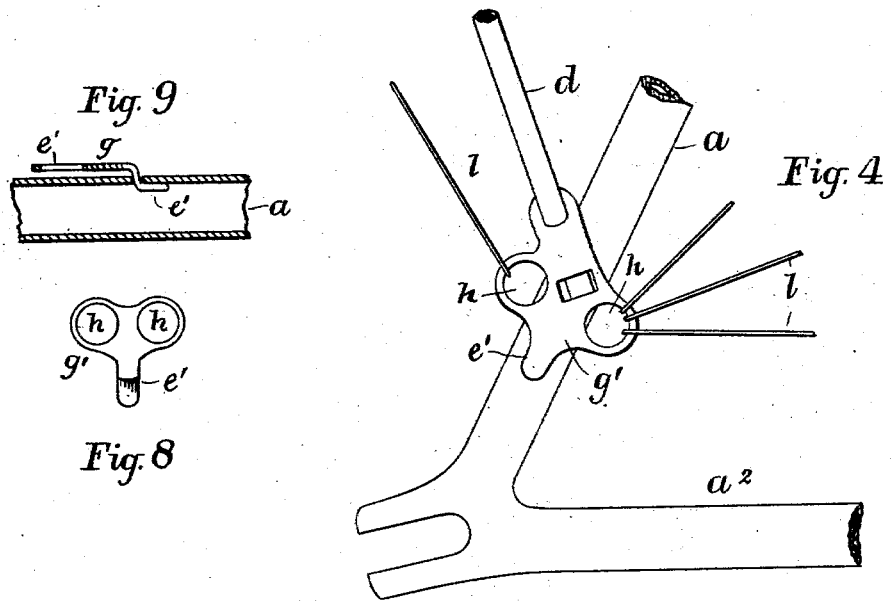
Fig. 4
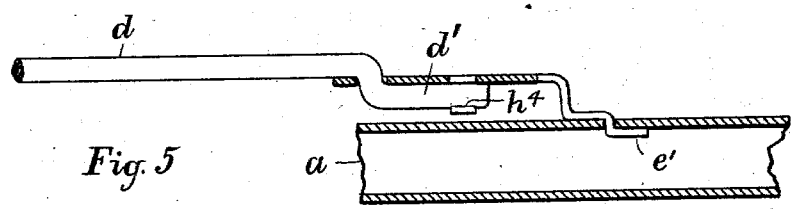
Fig. 5
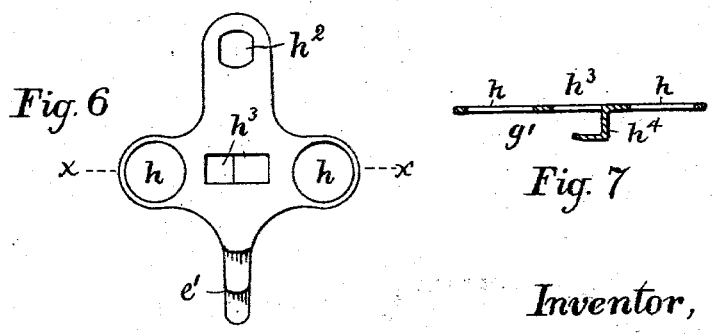
Fig. 6
Fig. 7
Attest;
E. W. Waite
E. E. Waite
Inventor,
William J. Chapman;
By A. B. Upham,
Attorney in fact.

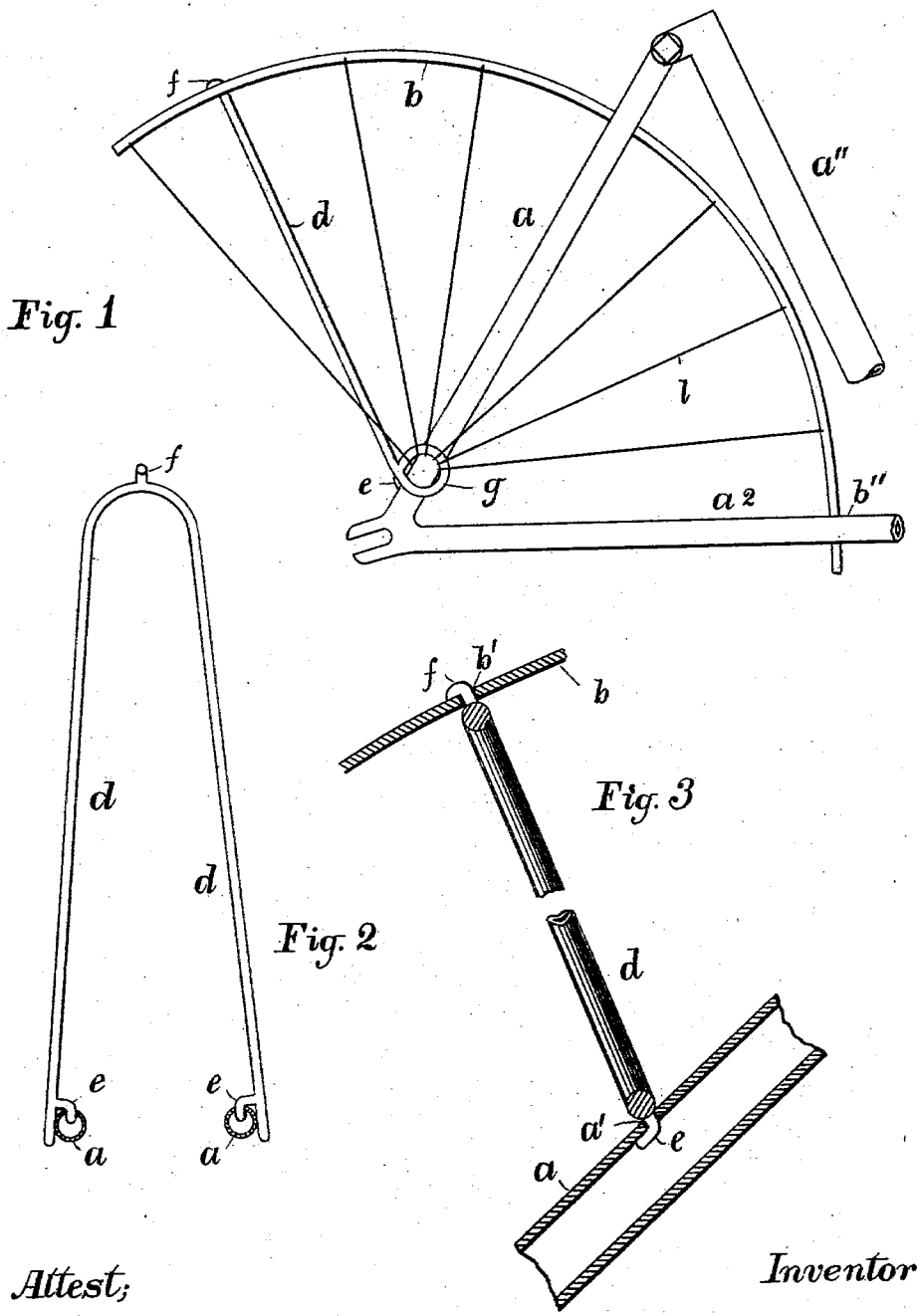

UNITED STATES PATENT OFFICE.

WILLIAM J. CHAPMAN, OF STOUGHTON, MASSACHUSETTS, ASSIGNOR TO THE CHAPMAN & SONS MANUFACTURING COMPANY, OF SAME PLACE.

BICYCLE-GUARD.

SPECIFICATION forming part of Letters Patent No. 634,520, dated October 10, 1899.

Application filed December 19, 1898. Serial No. 699,690. (No model.)

*To all whom it may concern:*

Be it known that I, WILLIAM J. CHAPMAN, a citizen of the United States, residing at Stoughton, in the county of Norfolk and State of Massachusetts, have invented a new and useful Improvement in Bicycle-Guards, of which the following is a full, clear, and exact description.

The object of this invention is the construction of improved means for attaching the mud-guard brace to the bicycle-frame and to the mud-guard, and, further, for an improved lacing-bracket and means for securing it in place.

In the attachment of lacing-brackets and guard-braces to ladies' bicycles it is customary to drill and tap screw-holes in the bicycle-frame; but as the tubing of which the frames are composed is quite thin the thickness of metal for engaging the attaching-screws is so comparatively slight that it is very difficult to make such screws remain in place. Their threads or those of the screw-holes either strip off or the screws jar out and the parts become unfastened. Moreover, the screws themselves and the labor of drilling and tapping the screw-holes constitute an added item of expense in the construction of a bicycle.

In my construction I do away entirely with screws for the attachment of the lacing-brackets to the bicycle-tubing and for securing the mud-guard brace to the guard and to the tubing, as illustrated in the drawings forming part of this specification, and in which—

Figure 1 is a side elevation of a portion of a bicycle-frame, showing my guard-brace and lacing-bracket attached thereto. Fig. 2 is a view of the guard-brace from the rear. Fig. 3 is a detail view illustrating the method of attaching the guard-brace to the guard and to the frame-tubing. Fig. 4 is a side elevation of a modified form of the lacing-bracket and the means for attaching it and the brace-rod to the tubing. Fig. 5 is a sectional detail view of this modification. Fig. 6 is a face view of this modified form of lacing-bracket, and Fig. 7 is a sectional view of the same on the line X X in Fig. 6; and Figs. 8 and 9, a further modification of bracket.

In the preferred form of my invention I make each lacing-bracket $g$ integral with the lower end of the brace-rod $d$, as in Fig. 1, and the two brace-rods are from one continuous length of metal, as shown in Fig. 2. At the lower end of each brace-rod I form a hook $e$, extending down and backward, as shown in Fig. 3, and also reaching inwardly, as shown in Fig. 2. At the upper part of the bend uniting these brace-rods I form a substantially similar hook $f$, reaching up and backward, as shown in Fig. 3.

Having drilled a simple hole $b'$ through the mud-guard $b$ and holes $a'$ through the tubes $a$, all that is necessary to do in order to apply the brace-rods is to insert the points of the hooks $e$ in the holes $a'$, with the guard-brace or brace-rods $d$ extending backward from such holes and somewhat below a horizontal position. With the guard-brace thus positioned, the hooks $e$ can be worked into the holes $a'$ and said brace raised into its normal position, as shown in Figs. 1 and 3. The mud-guard $b$ is now taken and with its rear portion in a vertical position its hole $b'$ is engaged with the hook $f$. The mud-guard is now swung forward and downward on such hook as a pivot until its front end can be secured to the frame at $b''$ in the usual manner.

The relative positions of the tubing $a$, guard-brace and guard, and of the hooks $e$ and $f$ are now those illustrated in Fig. 3, by which it will be clearly seen that so long as the guard and tubing retain these positions it will be impossible for the hooks to become disengaged. After said parts have been thus put in position the lacing $l$ is strung through the lacing-brackets $g$ and the guard in the usual manner.

In the modified construction set forth in Fig. 4 the lacing-brackets $g'$ are made separate from the brace $d$, although the mode of attaching the upper end thereof to the guard remains the same. Here the lacing-bracket is stamped from sheet metal and formed with two lacing-eyes $h$ and with a slightly-modified hook $e'$. In the body of this bracket are two slots $h^2$ $h^3$, through the former of which is inserted the offset end $d'$ of the brace $d$. The slot $h^3$ does not cut the material of the bracket entirely away, but shapes the same into the hand $h^4$. After having inserted the offset end $d'$ of the brace through the slot or hole $h^2$ the bracket $g'$ is swung around until its hand $h^4$ firmly engages the same, as shown in Fig. 5. In applying this form of bracket and brace the two brackets are first attached to the tubes $a$ by the insertion of the hooks $e'$ in the holes $a'$. The guard-brace is then connected with the brackets, as already described, and then the guard is engaged with the hook $f$ and brought down and fastened at $b''$, as set forth in the description of the first form of my invention.

In case it is desired to apply the lacing-brackets to the tubing independently of the brace I construct the same as shown in Figs. 8 and 9. Here the bracket is formed only with the lacing-eyes $h$ and the hook $e'$, the lacing-cords serving to keep the hook from disengagement with the hole $a'$ in the tubing after it has once been inserted therein and the bracket brought back against the said tubing.

What I claim as my invention, and for which I desire Letters Patent, is as follows, to wit:

1. In a bicycle, the combination with the tubing having the holes through the walls thereof, of the guard-brace having the hooks at the upper and lower ends, and the guard having the hole in the same, whereby said brace can be secured to the guard and tubing by engagement of said hooks with said holes, and after the forward end of the guard has been fastened in place, all said parts are rigidly united, substantially as set forth.

2. In a bicycle, the combination with the tubing having the holes through the walls thereof, of the guard-brace having the hooks at the upper and lower ends and the lacing-brackets at the lower ends, and the guard having the hole through the same, whereby said brace and brackets can be secured to the guard and tubing by the engagement of said hooks with said holes, and after the forward part of said guard has been fastened in place and the lacing strung between the brackets and guard, all said parts are rigidly united, substantially as set forth.

3. In a bicycle, the combination of the tubing having the hole through its wall, the lacing-bracket having the hook inserted in said hole, the guard means for supporting the rear of said guard and the lacing strung between said bracket and guard, said hook and hole being so arranged that after such lacing has been strung, even if loosely, said hook cannot become disengaged from the hole in the tubing, substantially as set forth.

In testimony that I claim the foregoing invention I have hereunto set my hand, this 16th day of December, 1898.

WILLIAM J. CHAPMAN.

Witnesses:
F. E. CALLER,
A. B. UPHAM.